United States Patent

Tsai et al.

[11] Patent Number: 5,688,539
[45] Date of Patent: Nov. 18, 1997

[54] ZIPPER TEETH FORMING MECHANISM FOR ZIPPER FORMING MACHINES

[75] Inventors: Ray-Long Tsai; Joseph Wu, both of Taoyuan, Taiwan

[73] Assignee: Chung Shan Institute of Science & Technology, Lungtan Taoyan, Taiwan

[21] Appl. No.: 647,847

[22] Filed: May 3, 1996

[51] Int. Cl.⁶ ............................................. B29D 5/00
[52] U.S. Cl. .................. 425/363; 425/374; 425/392; 425/814
[58] Field of Search ..................... 425/383, 363, 425/392, 374, 814

[56] References Cited

U.S. PATENT DOCUMENTS

| | | | |
|---|---|---|---|
| 3,077,001 | 2/1963 | Yoshida | 425/814 |
| 3,152,433 | 10/1964 | Burbank | 425/814 |
| 4,090,832 | 5/1978 | Moertel | 425/814 |
| 4,599,065 | 7/1986 | Takahashi | 425/814 |
| 4,665,613 | 5/1987 | Matsuda | 425/814 |

FOREIGN PATENT DOCUMENTS 2173442   10/1986   United Kingdom .................. 425/814

*Primary Examiner*—James P. Mackey
*Attorney, Agent, or Firm*—Fish & Richardson P.C.

[57] ABSTRACT

An improved zipper teeth forming mechanism for zipper forming machines. The teeth forming mechanism includes a mold base, a support seat, a seat cover, a screw sleeve and a ram mechanism. The screw sleeve consists of an upper portion and a lower portion defining a space therebetween for accommodating a forming screw. The upper portion has an elongate groove and a notch. A central rod is disposed in the groove while the ram mechanism is secured at the notch of the upper portion of the screw sleeve. The ram mechanism consists of a ram adjusting seat with a post, a bearing positioned on the post, a ram roller fitted on the bearing and a slide block fitted on the post of the ram adjusting seat.

3 Claims, 4 Drawing Sheets

ZIPPER TEETH FORMING MECHANISM FOR ZIPPER FORMING MACHINES

BACKGROUND OF THE INVENTION

The present invention relates generally to a zipper forming machine, and more particularly to an improved zipper teeth forming mechanism for zipper forming machines.

In the prior art, gears and belts are generally used to transmit power to the grooved teeth at upper end of two screw rods so that the forming screw rotates, causing the nylon filament to wind upwardly along the grooves between the screw rods. The nylon filament is then battered by means of a ram mechanism into zipper teeth. However, such a zipper teeth forming mechanism has the following disadvantages:

1. The clearance between the two screw rods is extremely narrow and is usually less than 1 m/m, hence it does provide not enough space for mounting a forming screw support structure, such as bearing.
2. As the forming screw is rotated by means of the two drive gears which transmit power to the two screw rods, it is not possible to eliminate the clearance between gears so that the forming screw may tend to become inclined and may generate noise.
3. In the prior art, the baffle heads and baffle pieces at the upper ends of the screw rods are utilized in adjusting the axial height of the forming screw. In such an arrangement, the screw rods will directly contact the baffle pieces in transmission, resulting in high heat, which accelerate damage and wear of parts.
4. Prior ram mechanisms are complicated in construction and may easily generate noise.

SUMMARY OF THE INVENTION

Accordingly, a primary object of the present invention is to provide an improved zipper teeth forming mechanism for zipper forming machines which is simple in construction, requires less parts and is less costly.

Another object of the present invention is to provide an improved zipper teeth forming mechanism for zipper forming machines in which rotational speed may be enhance to increase production efficiency.

In order to achieve the above-mentioned objects, the improved zipper teeth forming mechanism according to the present invention essentially comprises a mold base, a support seat, a seat cover, a screw sleeve and a ram mechanism. The improvement resides in the screw sleeve which consists of an upper portion and a lower portion, defining a hollow therebetween for accommodating a forming screw, the upper portion having an elongate groove and a notch. A central rod is fitted into the elongate groove while the ram mechanism is arranged at the notch. The ram mechanism is comprised of a ram adjusting seat with a post, a bearing positioned on the post, a ram roller fitted onto the bearing and a slide block fitted below the post. The support seat is provided with a slot for accommodating the screw sleeve; the mold base is provided with a block with a through hole and the screw sleeve is disposed adjacent to the block of the mold base; the forming screw has one end passing through the through hole of the block to be secured on a belt pulley. The belt pulley is employed to rotate the single forming screw (as distinguished from the dual screw rod and forming mechanism in the prior art), eliminating the drawbacks with the prior art.

BRIEF DESCRIPTION OF THE DRAWINGS

The present invention will now be described by way of example with reference to the annexed drawings, in which.

DETAILED DESCRIPTION OF THE PREFERRED EMBODIMENT

Figure 1:
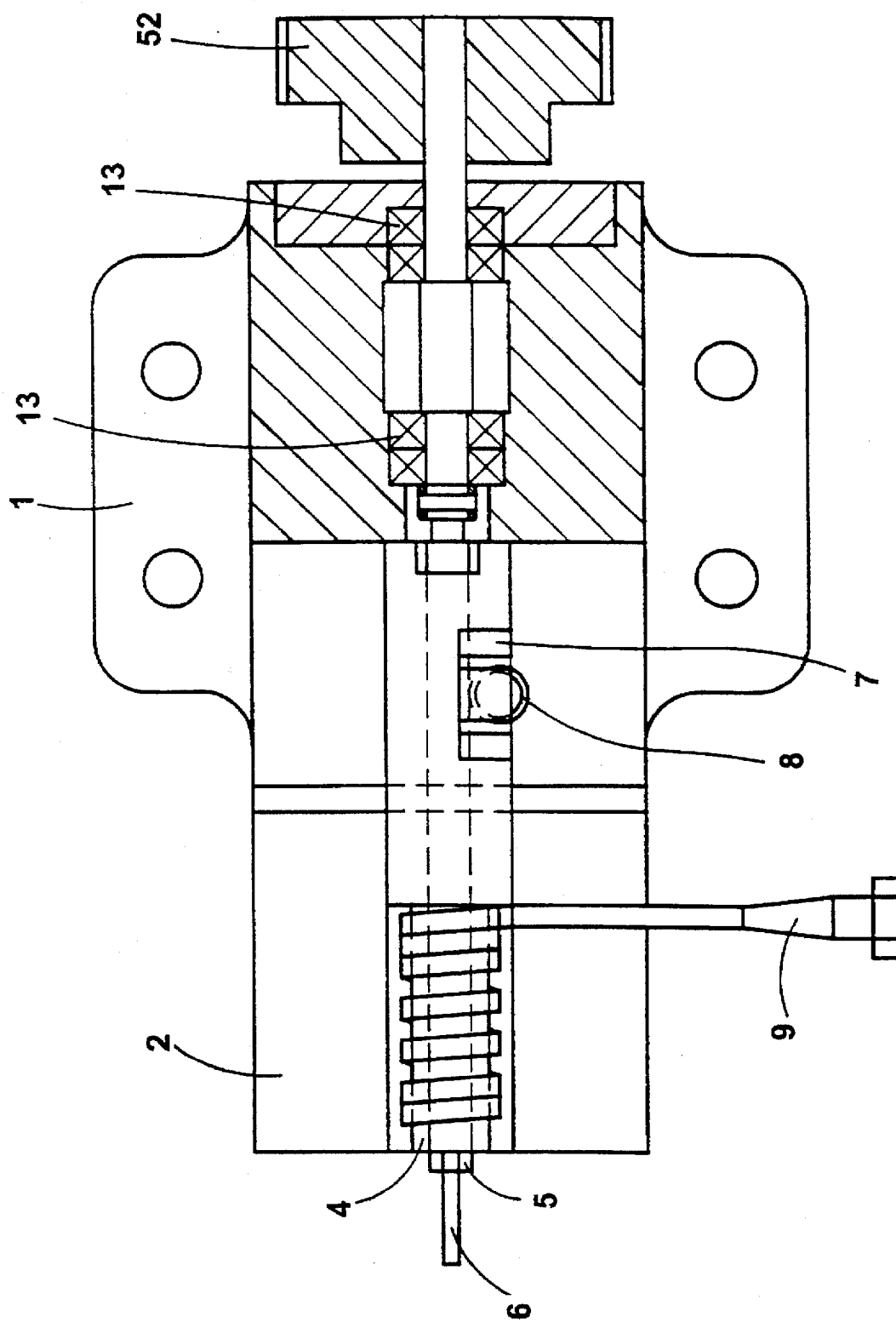
FIG. 1 is a schematic view of the improved zipper teeth forming mechanism of the present invention in an assembled state.
Figure 2:
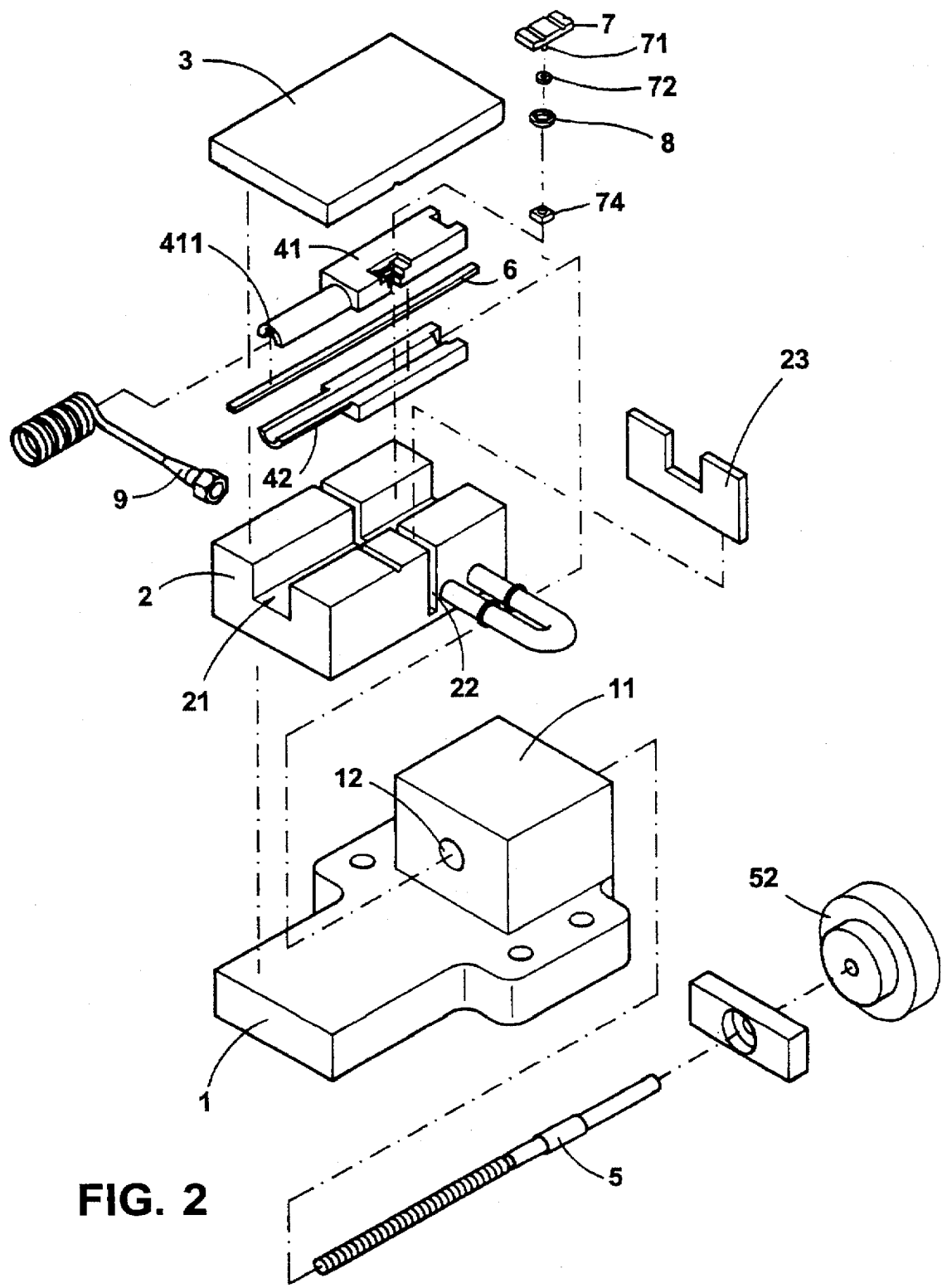
FIG. 2 is a schematic, exploded view of the invention.
Figure 3:
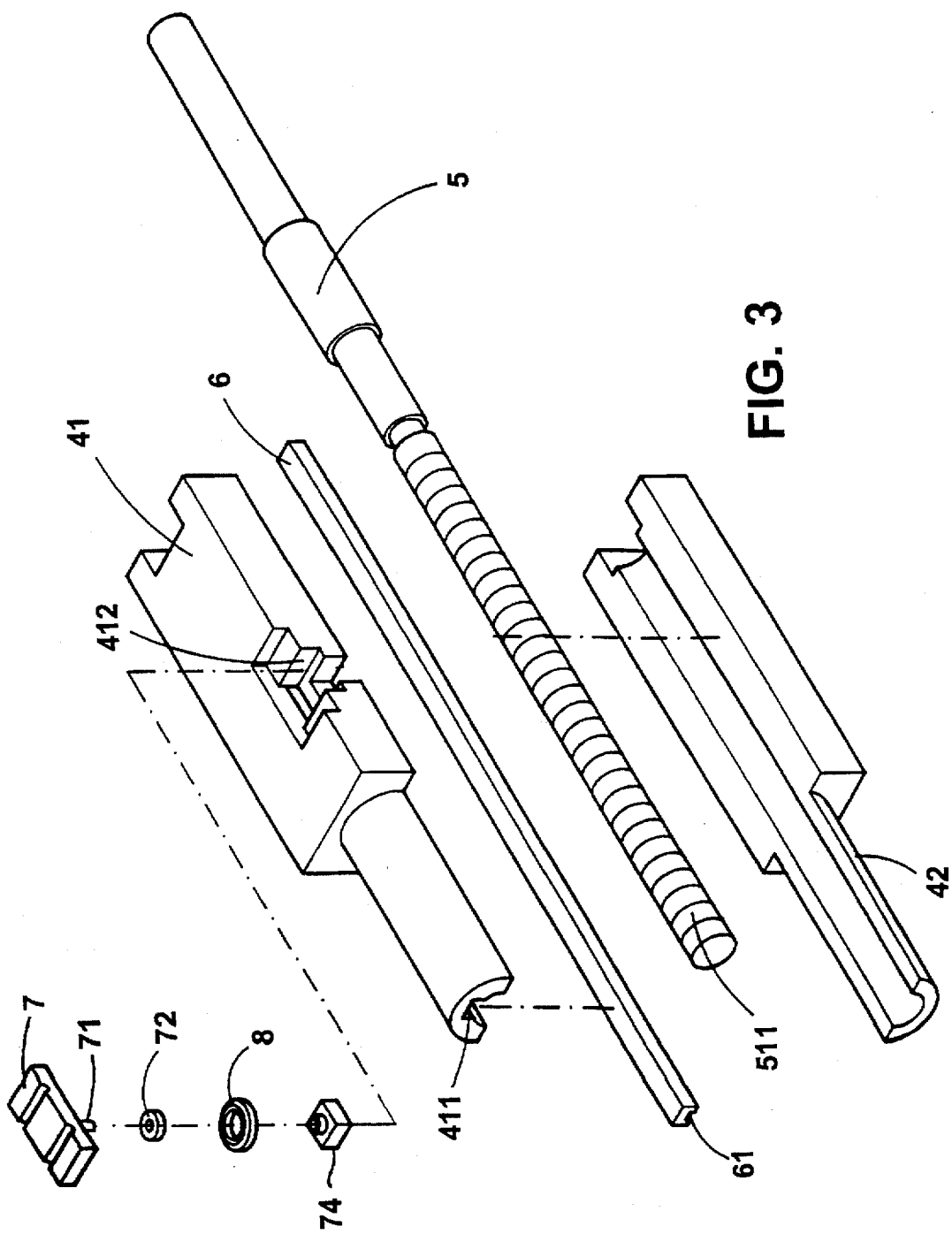
FIG. 3 is a schematic view of the invention in part.

With reference to FIGS. 1–3, the present invention essentially comprises a mold base 1, a support seat 2, a seat cover 3, a screw sleeve 4, a forming screw 5, a central rod 6, a ram adjusting seat 7, a ram roller 8 and a heating coil 9. The mold base 1 has one end provided with a block 11 with a through hole 12 through which the forming screw 5 is inserted. The support seat 2 is disposed adjacent to the block 11 of the mold base 1. It has an axially oriented, elongate slot 21 provided in an upper side thereof and a clearance 22 suitably formed at a central portion thereof. An insulation pad 23 is disposed in the clearance 22 for insulating heat. The screw sleeve 4 consists of two corresponding halves, i.e., an upper portion 41 and a lower portion 42. As the respective inner walls of the upper and lower portions 41, 42 are hemispherical, when they are coupled together, they form the screw sleeve 4 with a hollow interior defined therebetween and a rear circular section. The heating coil 9 is fitted onto the circular section of the screw sleeve 4. The upper portion 41 of the screw sleeve 4 is provided with an axially oriented, elongate groove 411 in the inner wall thereof, while a notch 412 is formed at a lateral side thereof at a suitable position. The central rod 6 is fitted into the groove 411 of the screw sleeve 4. The central rod 6 has a relatively smaller elongate gap 61 for passage of a center-line. The forming screw 5 has one end provided with multiple threads 511 and the other end passing through the through hole 12 of the block 11 to be fixedly secured on a belt pulley 52. The forming screw 5 may be rotated by means of the belt pulley 52. The ram adjusting seat 7 has a post 71 at a bottom side thereof onto which a bearing 72 and the ram roller 8 are respectively fitted. The post 71 has its bottom end fitted into a slide block 74. These components are secured on the support seat 2 by means of the seat cover 3.

Figure 4:
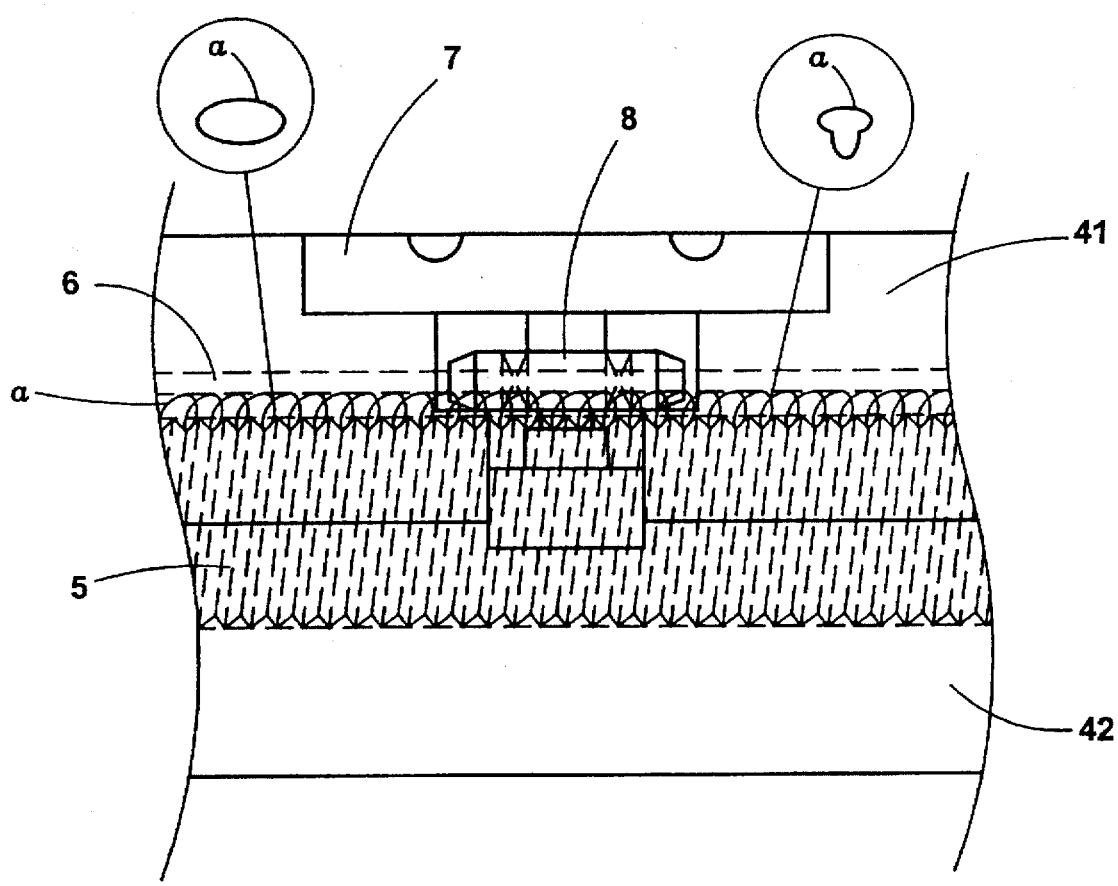
FIG. 4 is a schematic view of a preferred embodiment of the invention in use.

With reference to FIG. 4 which shows operation of the present invention, when the belt pulley 52 transmits power directly to the forming screw 5 so that a nylon filament a follows the slots 511 of the forming screw 5 to wind upwardly into shape, as the nylon filament a passes through the hollow of the circular section of the screw sleeve 4, the heating coil 9 enveloping the screw sleeve 4 will heat the nylon filament to soften it. Therefore, when the nylon filament a is lifted upwardly to the ram roller 8, it is pressed into zipper teeth by means of the ram roller 8.

While only one embodiment of the present invention has been shown and described, it will be understood that various modifications and changes could be made without departing from the spirit and scope of the invention disclosed.

What is claimed is:

1. An improved zipper teeth forming mechanism for zipper forming machines, comprising a mold base; a support seat positioned on said mold base; a seat cover; a screw sleeve positioned within said support seat and covered by said seat cover; and a ram mechanism; wherein said screw sleeve includes an upper portion and a lower portion, and a forming screw is disposed between said upper portion and said lower portion of said screw sleeve, said upper portion having an elongate groove and a notch along an inner wall of the upper portion that is proximal to said forming screw, an axis of said elongate groove substantially parallel to an axis of the forming screw and said notch laterally offset from the axis of the elongate groove, said elongate groove receiving a central rod having an elongate gap adjacent to said forming screw for molding a shape of a nylon filament inserted between said forming screw and the central rod; and wherein said ram mechanism is fitted in said notch and includes a ram adjusting seat provided with a post, a bearing positioned on said post, a ram roller fitted onto said bearing, and a slide block fitted onto the end of said post opposite the ram adjusting seat, said ram roller for pressing the nylon filament against the forming screw and forming zipper teeth.

2. An improved zipper teeth forming mechanism for zipper forming machines as claimed in claim 1, wherein said support seat has a slot for accommodating said screw sleeve.

3. An improved zipper teeth forming mechanism for zipper forming machines as claimed in claim 1, wherein said mold base is provided with a block which has a through hole, said support seat being disposed adjacent to said block of said mold base, said forming screw having one end passing through said through hole of said block to be fixed onto a belt pulley.

* * * * *